(12) United States Patent
Knittel

(10) Patent No.: US 11,468,296 B2
(45) Date of Patent: Oct. 11, 2022

(54) RELATIVE POSITION ENCODING BASED NETWORKS FOR ACTION RECOGNITION

(71) Applicant: CANON KABUSHIKI KAISHA, Tokyo (JP)

(72) Inventor: Anthony Knittel, Maroubra (AU)

(73) Assignee: Canon Kabushiki Kaisha, Tokyo (JP)

( * ) Notice: Subject to any disclaimer, the term of this patent is extended or adjusted under 35 U.S.C. 154(b) by 1067 days.

(21) Appl. No.: 16/042,452

(22) Filed: Jul. 23, 2018

(65) Prior Publication Data

US 2019/0034787 A1 Jan. 31, 2019

(30) Foreign Application Priority Data

Jul. 25, 2017 (AU) .................. 2017208235

(51) Int. Cl.
  *G06N 3/04* (2006.01)
  *G06K 9/62* (2022.01)
  *G06N 3/08* (2006.01)

(52) U.S. Cl.
  CPC ......... *G06N 3/0472* (2013.01); *G06K 9/6217* (2013.01); *G06K 9/6267* (2013.01); *G06N 3/049* (2013.01); *G06N 3/0445* (2013.01); *G06N 3/0454* (2013.01); *G06N 3/0481* (2013.01); *G06N 3/08* (2013.01)

(58) Field of Classification Search
  CPC .. G06K 9/6217; G06K 9/6267; G06N 3/0445; G06N 3/0454; G06N 3/0472; G06N 3/0481; G06N 3/049; G06N 3/08
  See application file for complete search history.

(56) References Cited

U.S. PATENT DOCUMENTS 8,630,966 B2   1/2014   Gage

OTHER PUBLICATIONS

Wang et al., "Hierarchical Attention Network for Action Recognition in Videos", Jul. 21, 2016, pp. 1-9 (Year: 2016).*
Deng et al., "Structure Inference Machines: Recurrent Neural Networks for Analyzing Relations in Group Activity Recognition", 2016, Proceedings of the IEEE Conference on Computer Vision and Pattern Recognition (CVPR), pp. 4772-4781 (Year: 2016).*
Ramanathan et al., "Detecting Events and Key Actors in Multi-Person Videos", 2016, Proceedings of the IEEE Conference on Computer Vision and Pattern Recognition (CVPR), pp. 3043-3053 (Year: 2016).*
Liu et al., "3D-based Deep Convolutional Neural Network for action recognition with depth sequences", 2016, Image and Vision Computing 55, pp. 93-100. (Year: 2016).*

(Continued)

*Primary Examiner* — Brent Johnston Hoover
(74) *Attorney, Agent, or Firm* — Canon U.S.A., Inc. IP Division

(57) ABSTRACT

The present disclosure provides a method of recognising a first action. The method comprises determining a weighted combination of a first plurality of feature responses associated with a sequence of second actions over a period of time using a set of weights at a particular time instance in the period of time. The method then recognises the first action by processing, using a neural network, the weighted combination of the first plurality of feature responses and temporal position values of each of the first plurality of feature responses associated with the sequence of second actions.

9 Claims, 11 Drawing Sheets

(56) References Cited

OTHER PUBLICATIONS

Hochreiter, et. al., Long short-term memory, Neural Computation 9(8): 1735-1780, 1997 ; pp. 1-32.
Ng, et. al., Beyond short snippers: deep networks for video classification, Apr. 13, 2015.
Ouyang, et. al., DeepID-Net: deformable deep convolutional neural networks for object detection, Computer Vision and Pattern Recognition (CVPR) 2015, 2015; Chinese University of Hong Kong ; pp. 2403-2412.
Fernando, et. al., Discriminative hierarchical rank pooling for activity recognition, CVPR, Jun. 2016; pp. 1-9.

* cited by examiner

RELATIVE POSITION ENCODING BASED NETWORKS FOR ACTION RECOGNITION

TECHNICAL FIELD

The present invention relates to a method, system and apparatus of recognizing actions in a sequence of images over a period of time using an artificial neural network.

BACKGROUND

Analysis of data involves classifying the data into categories. For example, a video may be analyzed to determine one or more complex actions occurring in the video. One method for performing such an analysis is using an artificial neural network, which would, for example, output a label representing an object present in the image or classifying an action performed by a person in a video.

An artificial neural network includes a set of nodes, a set of weights and a set of edges, also referred to as connections. Each of the edges is weighted and connects two nodes of the network. The weighted edges are also referred to as weighted connections. The artificial neural network is trained using a set of training input instances and training targets to apply a classification label to new data based on the relationship between training data instances and labels.

The existing data driven methods, such as Convolutional Neural Networks, for analyzing video suffer from large memory requirements in the order of 100s of Giga Bytes (GB) to process a video consisting of hundreds or thousands of frames, making such methods impractical for current generation of machines with about 12 GB of memory. Convolutional Neural Networks also do not accurately classify action events that occur with large variations over time.

Recurrent Neural Networks process features representing events occurring in video, and are able to classify events with large variations over time better than Convolutional Neural Network methods. However, recurrent neural networks, when operating on hundreds or thousands or more frames, suffer from instability, such that the network does not train effectively, and the trained network does not generalize well. Hence, recurrent neural networks have low accuracy of action classification, for example when operating on video with hundreds or thousands or more frames.

Thus, a need exists to address accuracy and instability problems associated with use of neural networks for action classification.

SUMMARY

The present invention relates to a method of recognizing an action or event in a sequence of images over a period of time (e.g., a video) or audio data over a period of time. The method uses artificial neural networks that are trained to learn features to recognize relative ordering of actions or events in the video or audio data.

An aspect of the present disclosure provides a method of recognizing a first action, the method comprising: determining a weighted combination of a first plurality of feature responses associated with a sequence of second actions over a period of time using a set of weights at a particular time instance in the period of time; and recognizing the first action by processing, using a neural network, the weighted combination of the first plurality of feature responses and temporal position values of each of the first plurality of feature responses associated with the sequence of second actions.

An aspect of the present disclosure provides an apparatus configured to recognize a first action, the apparatus comprising: a processor; a computer readable medium storing one or more software application programs, wherein the software application programs are executable by the processor to perform the steps of: determining a weighted combination of a first plurality of feature responses associated with a sequence of second actions over a period of time using a set of weights at a particular time instance in the period of time; and recognizing the first action by processing, using a neural network, the weighted combination of the first plurality of feature responses and temporal position values of each of the first plurality of feature responses associated with the sequence of second actions.

An aspect of the present disclosure provides a non-transitory computer readable storage medium storing one or more software application programs for recognizing a first action, said software application programs configured to cause a computer apparatus to perform the steps of: determining a weighted combination of a first plurality of feature responses associated with a sequence of second actions over a period of time using a set of weights at a particular time instance in the period of time; and recognizing the first action by processing, using a neural network, the weighted combination of the first plurality of feature responses and temporal position values of each of the first plurality of feature responses associated with the sequence of second actions.

An aspect of the present disclosure provides a method of recognizing a first action or a first event using a neural network, the method comprising: receiving a first plurality of feature responses associated with a sequence of second actions or second events over a period of time, wherein the sequence of second actions or second events is associated with the first action or the first event; determining weighted combinations of the first plurality of feature responses, each of the weighted combinations of the first plurality of feature responses comprising a set of the first plurality of feature responses weighted according to a set of weights at a particular time instance in the period of time; generating a second plurality of feature responses based on the weighted combinations of the first plurality of feature responses and an attenuation function, the attenuation function being based on a weighted combination of temporal position values of each of the first plurality of feature responses; and processing the second plurality of feature responses with a neural network to recognize the first action or the first event.

Another aspect of the present disclosure provides an apparatus configured to recognize a first action or a first event using a neural network, the first action or the first event comprising a sequence of second actions or second events, the apparatus comprising: a processor; a computer readable medium storing one or more software application programs, wherein the software application programs are executable by the processor to perform the steps of: receiving a first plurality of feature responses associated with the sequence of second actions or second events over a period of time; determining weighted combinations of the first plurality of feature responses, each of the weighted combinations of the first plurality of feature responses comprising a set of the first plurality of feature responses weighted according to a set of weights at a particular time instance in the period of time; generating a second plurality of feature responses based on the weighted combinations of the first plurality of feature responses and an attenuation function, the attenuation function being based on a weighted combination of temporal position values of each of the first plurality of feature responses; and processing the second plurality of feature responses with a neural network to recognize the first action or the first event.

Another aspect of the present disclosure provides a computer readable storage medium storing one or more software application programs for recognizing a first action or a first event using a neural network, the first action or the first event comprising a sequence of second actions or second events, said software application programs configured to cause a computer apparatus to perform the steps of: receiving a first plurality of feature responses associated with the sequence of second actions or second events over a period of time; determining weighted combinations of the first plurality of feature responses, each of the weighted combinations of the first plurality of feature responses comprising a set of the first plurality of feature responses weighted according to a set of weights at a particular time instance in the period of time; generating a second plurality of feature responses based on the weighted combinations of the first plurality of feature responses and an attenuation function, the attenuation function being based on a weighted combination of temporal position values of each of the first plurality of feature responses; and processing the second plurality of feature responses with a neural network to recognize the first action or the first event.

BRIEF DESCRIPTION OF THE DRAWINGS

One or more embodiments of the invention will now be described with reference to the following drawings, in which.

DETAILED DESCRIPTION INCLUDING BEST MODE

Figure 1:
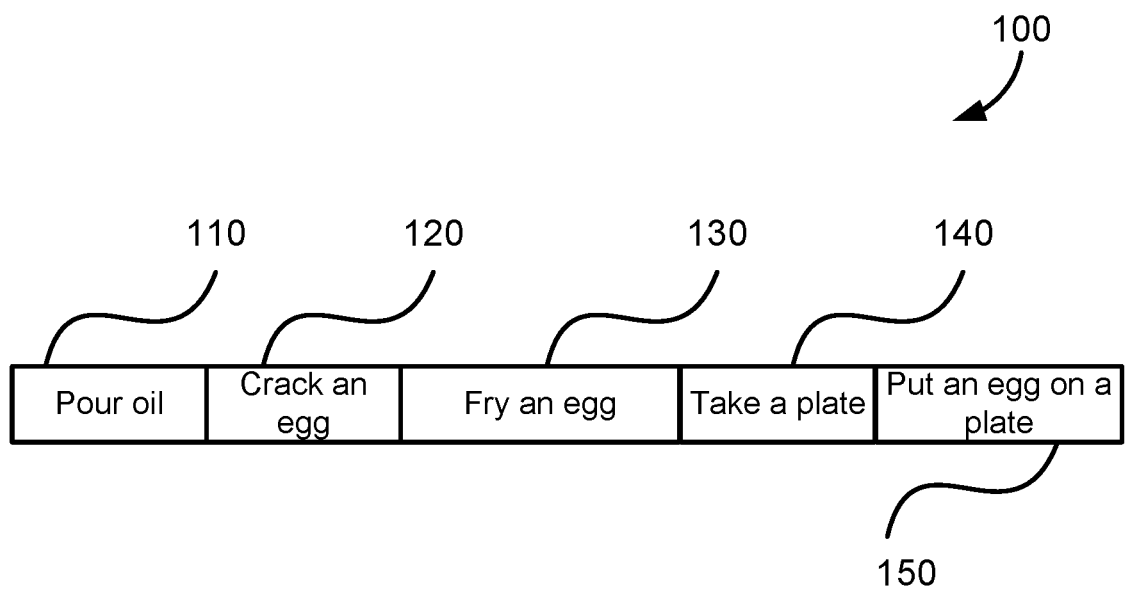
FIG. 1 is a schematic block diagram of a temporal sequence of simple actions constituting a complex action.

It is an object of the present disclosure to substantially overcome, or at least ameliorate, at least one disadvantage of present arrangements.

Where reference is made in any one or more of the accompanying drawings to steps and/or features, which have the same reference numerals, those steps and/or features have for the purposes of this description the same function(s) or operation(s), unless the contrary intention appears.

Context

An artificial neural network includes multiple layers and is used for classifying actions or events in a sequence of images over a period of time (i.e., a video) or audio data over a period of time. An example of an action is an activity such as preparing a meal in a kitchen. An example of an event is a football match at a stadium. The method will be described hereinafter in relation to recognizing actions in a sequence of images, but the method also can be applied to audio data. Further, the method will be described hereinafter in relation to recognizing actions, but the method is also applicable to recognizing events.

For simplicity of explanation hereinafter, actions discussed can be labelled as either a complex action or a simple action, where a complex action includes a sequence of simple actions. For example, as described hereinafter, a complex action may be an action of 'making a fried egg' which is constituted from simple actions of 'pour oil', 'crack an egg', and the like.

It would also be understood that a simple action could also be classified as a complex action. For example, the action of 'crack an egg' is classified as a simple action in the example above. However, the same action of 'crack an egg' can also be labelled as a complex action when describing the 'crack an egg' action as involving a sequence of simple actions, for example, of 'take an egg' and 'strike the egg'.

Therefore, the labelling of the actions as complex or simple is for simplification purposes only and for ease of description. The labelling of actions, as used in the description hereinafter, should not be taken as a feature of the present invention.

Alternatively, the actions can be labelled as either a first action or a second action. The first action being the same as a complex action, while the second action being the same as the simple actions. Therefore, a first action includes a sequence of second actions.

Actions in a video can occur over a short temporal duration, for example, one to two seconds or, equivalently, over 30-60 frames when there are 30 frames per second in the video.

Actions in a video can also over longer time periods, such as several seconds or minutes, or equivalently over thousands of frames, and also involve a sequence of other actions that are interdependent. Such actions are typically not classifiable based on any short segments of the video.

An example of a complex action that is constituted from a sequence of simple actions is shown in FIG. 1. FIG. 1 shows a video 100 for a complex action of 'making a fried egg'. As shown in FIG. 1 the complex action of 'making a fried egg' is constituted from five (5) simple actions including 'pour oil' 110, 'crack an egg' 120, 'fry an egg' 130, 'take a plate' 140, and 'put an egg on a plate' 150. Alternatively, the actions shown in FIG. 1 can be described as a first action of 'making a fried egg' that is constituted from five (5) second actions including 'pour oil' 110, 'crack an egg' 120, 'fry an egg' 130, 'take a plate' 140, and 'put an egg on a plate' 150.

In the video 100, the relative ordering of the constituent simple actions (i.e., 110 to 150) is more important for identification of the complex action than the temporal position or duration of the constituent simple actions (i.e., 110 to 150) in time.

In one arrangement, the complex action of 'making a fried egg' includes one or more events. Examples of the events include 'timer expiring', 'pan heated up', and the like.

Figure 2:
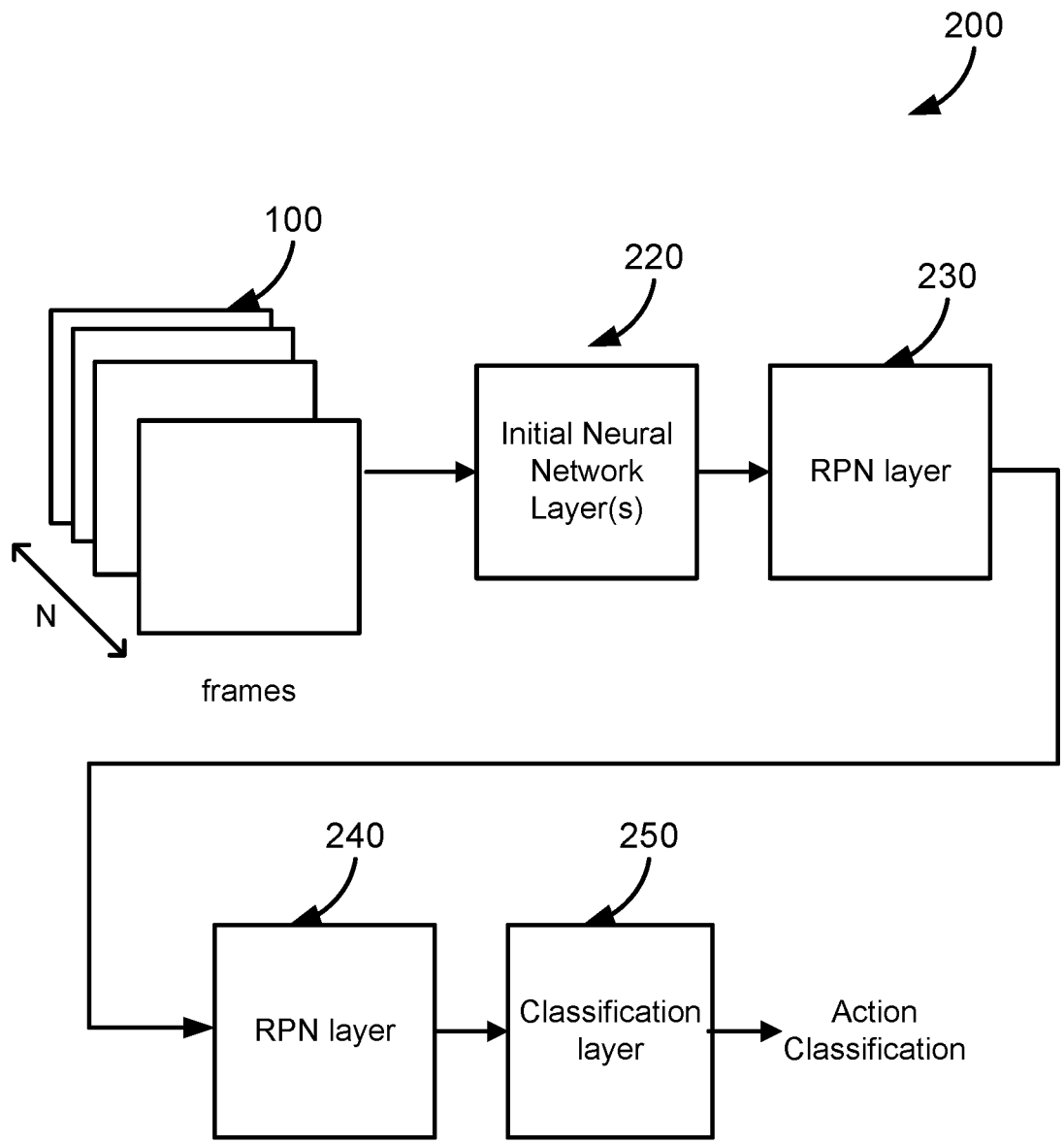
FIG. 2 is a schematic block diagram of a neural network system for recognizing a complex action in a sequence of images over a period of time.

FIG. 2 shows an action classification system 200 that is capable of classifying an action or an event in a video. The action classification system 200 includes initial neural network layers 220, two relative-position network (RPN) layers 230 and 240, and a classification layer 250. As depicted in FIG. 2, the input to the initial neural network layers 220 is the video 100 having N frames. The N frames are then processed by the initial neural network layers 220 (the last layer of which has C channels or filters) to produce an output of C×N feature responses 301. Each of the C channels produces an independent feature response for each of the N frames.

Other examples of the input to the action classification system 200 include audio data, financial data, demographic data, shopping data, and the like. Typically, any data that is dependent on time could be analyzed to determine an action or an event associated with the data.

The C×N feature responses 301 are then provided to the RPN layers 230 and 240, where the RPN layer 230 has a number C2 of RPN units 300 (shown in FIG. 3) and the RPN layer 240 has a number C3 of the RPN units 300. Thus, the output feature response of the RPN layer 230 has a dimension of C2×N and the output feature response of the RPN layer 240 has a dimension of C3×N. The output feature response of the RPN layer 240 is provided to the classification layer 250.

The classification layer 250 processes the C3×N dimension output of the RPN layer 240 to produce an action or an event classification, which is a probability value of each predefined action or event. In one arrangement, the classification layer 250 uses a soft-max function to classify the action or event. Each of the initial neural network layers 220, the RPN layers 230 and 240, and the classification layer 250 will be described in detail hereinafter.

The initial neural network layers 220 may include one or more neural network layers. In one arrangement, the initial neural network layers 220 may have no layers, in which case the input video 100 is passed directly to the first RPN layer 230.

Although two RPN layers 230 and 240 are shown to be used by the system 200, one or more than two RPN layers 230 and 240 can be used in the system 200.

Structural Context

Figure 10A:
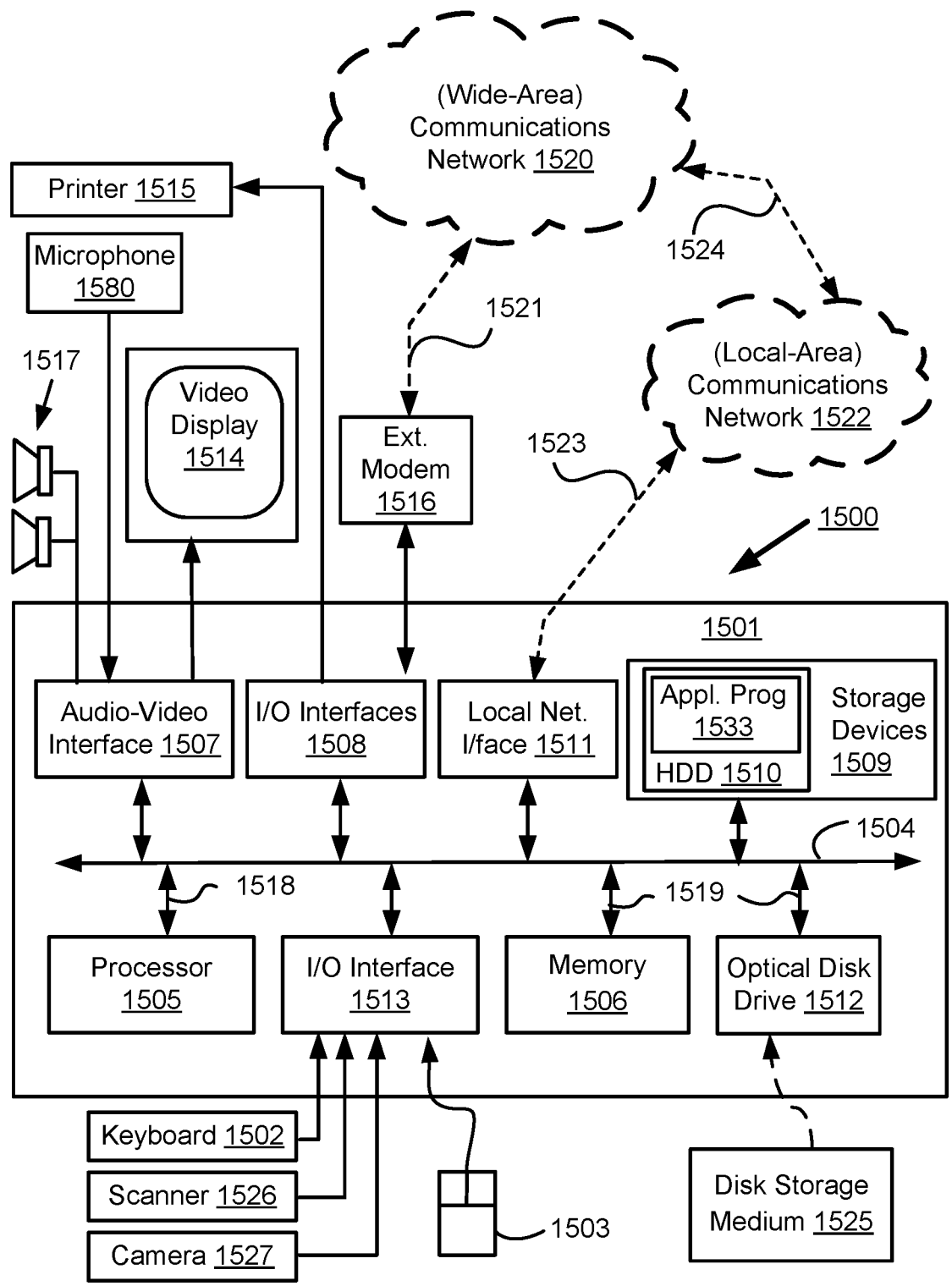
FIGS. 10A and 10B form a schematic block diagram of a general purpose computer system upon which the system of FIG. 2 can be practiced.
Figure 10B:
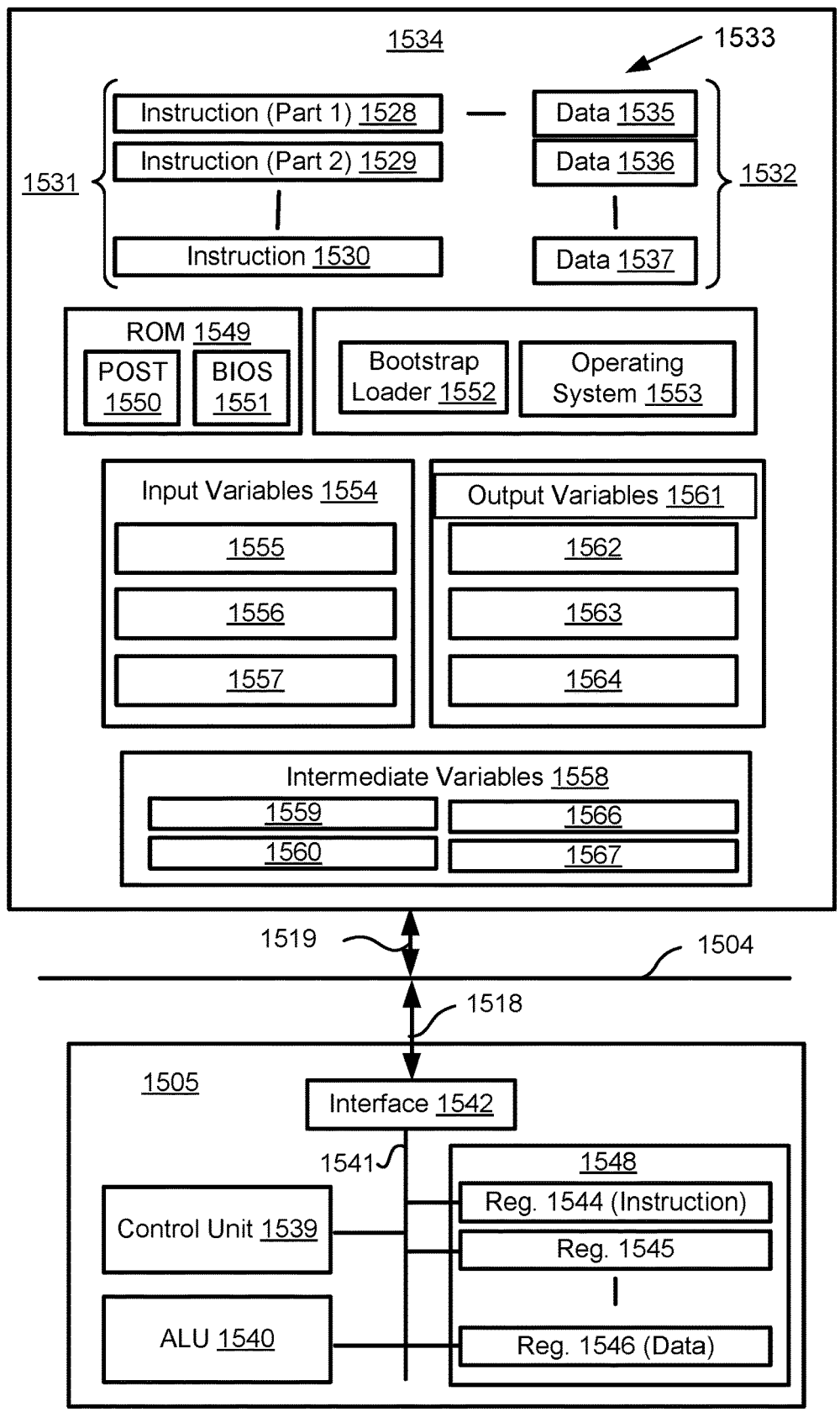

FIGS. 10A and 10B depict a general-purpose computer system 1500, upon which the system 200 described can be practiced.

As seen in FIG. 10A, the computer system 1500 includes: a computer module 1501; input devices such as a keyboard 1502, a mouse pointer device 1503, a scanner 1526, a camera 1527, and a microphone 1580; and output devices including a printer 1515, a display device 1514 and loudspeakers 1517. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes at least one processor unit 1505, and a memory unit 1506. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, loudspeakers 1517 and microphone 1580; an I/O interface 1513 that couples to the keyboard 1502, mouse 1503, scanner 1526, camera 1527 and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 10A, the local communications network 1522 may also couple to the wide network 1520 via a connection 1524, which would typically include a so-called "firewall" device or device of similar functionality. The local network interface 1511 may comprise an Ethernet circuit card, a Bluetooth® wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processor 1505 is coupled to the system bus 1504 using a connection 1518. Likewise, the memory 1506 and optical disk drive 1512 are coupled to the system bus 1504 by connections 1519. Examples of computers on which the described arrangements can be practiced include IBM-PC's and compatibles, Sun Sparcstations, Apple Mac™ or like computer systems.

Figure 5:
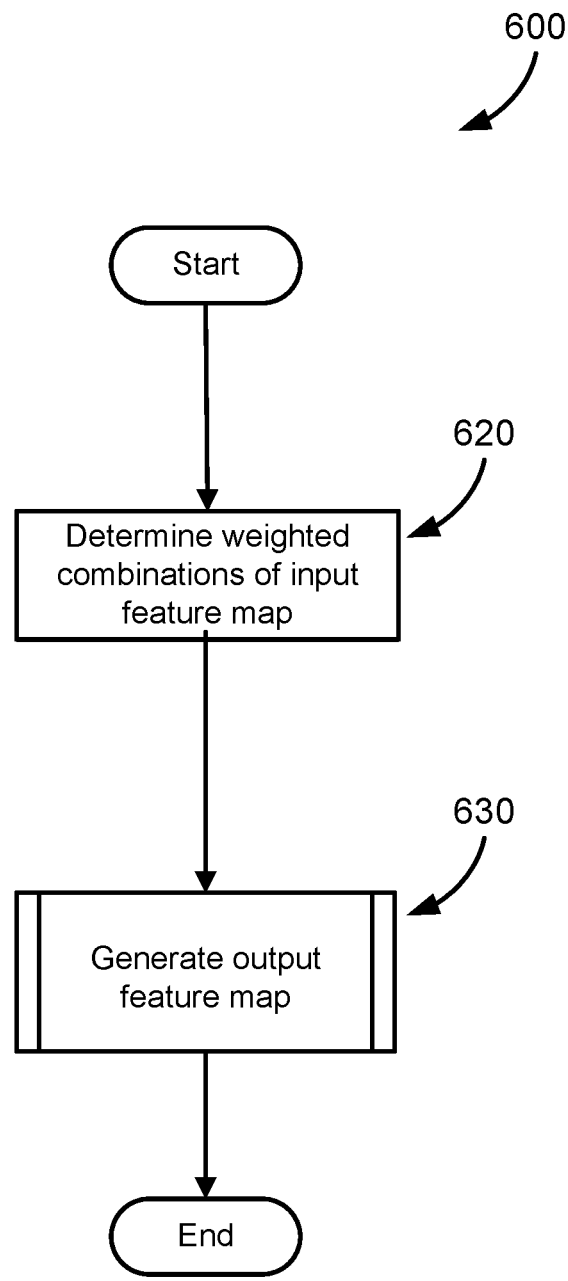
FIG. 5 is a flow chart of a method of processing feature responses in the RPN unit of FIG. 3.

The method of recognizing action in a sequence of images over a period of time may be implemented using the computer system 1500 wherein the initial neural network layers 220, the RPN layers 230 and 240, and the classification layer 250 together with the processes of FIG. 5, to be described, may be implemented as one or more software application programs 1533 executable within the computer system 1500. In particular, the steps of the method of FIG. 5 are effected by instructions 1531 (see FIG. 10B) in the software 1533 that are carried out within the computer system 1500. The software instructions 1531 may be formed as one or more code modules, each for performing one or more particular tasks. The software may also be divided into two separate parts, in which a first part and the corresponding code modules performs the action recognition method and a second part and the corresponding code modules manage a user interface between the first part and the user.

The software may be stored in a computer readable medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous apparatus for recognizing actions in a sequence of images over a period of time.

The software 1533 is typically stored in the HDD 1510 or the memory 1506. The software is loaded into the computer system 1500 from a computer readable medium, and executed by the computer system 1500. Thus, for example, the software 1533 may be stored on an optically readable disk storage medium (e.g., CD-ROM) 1525 that is read by the optical disk drive 1512. A computer readable medium having such software or computer program recorded on it is a computer program product. The use of the computer program product in the computer system 1500 preferably effects an apparatus for recognizing actions in a sequence of images over a period of time.

In some instances, the application programs 1533 may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1517 and user voice commands input via the microphone 1580.

FIG. 10B is a detailed schematic block diagram of the processor 1505 and a "memory" 1534. The memory 1534 represents a logical aggregation of all the memory modules (including the HDD 1509 and semiconductor memory 1506) that can be accessed by the computer module 1501 in FIG. 10A.

When the computer module 1501 is initially powered up, a power-on self-test (POST) program 1550 executes. The POST program 1550 is typically stored in a ROM 1549 of the semiconductor memory 1506 of FIG. 10A. A hardware device such as the ROM 1549 storing software is sometimes referred to as firmware. The POST program 1550 examines hardware within the computer module 1501 to ensure proper functioning and typically checks the processor 1505, the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 10A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 10A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 10B, the processor 1505 includes a number of functional modules including a control unit 1539, an arithmetic logic unit (ALU) 1540, and a local or internal memory 1548, sometimes called a cache memory. The cache memory 1548 typically includes a number of storage registers 1544-1546 in a register section. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1505 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1502, data retrieved from one of the storage devices 1506, 1509 or data retrieved from a storage medium 1525 inserted into the corresponding reader 1512, all depicted in FIG. 10A. The execution of a set of the instructions may in some cases result in output of data. Execution may also involve storing data or variables to the memory 1534.

The disclosed action recognition arrangements use input variables 1554, which are stored in the memory 1534 in corresponding memory locations 1555, 1556, 1557. The action recognition arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 10B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1533. Each fetch, decode, and execute cycle comprises:

a fetch operation, which fetches or reads an instruction 1531 from a memory location 1528, 1529, 1530;

a decode operation in which the control unit 1539 determines which instruction has been fetched; and an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIG. 5 is associated with one or more segments of the program 1533 and is performed by the register section 1544, 1545, 1547, the ALU 1540, and the control unit 1539 in the processor 1505 working together to perform the fetch, decode, and execute cycles for every instruction in the instruction set for the noted segments of the program 1533.

Therefore, the video 100 can be received by the system 200 (implemented in the computer system 1500) via the WAN 1520, LAN 1522, or the disk storage medium 1525. In another arrangement, the video 100 can be stored in the HDD 1510 and is retrieved by the system 200 when performing the action recognition method.

Description of Initial Neural Network Layers

Figure 4:
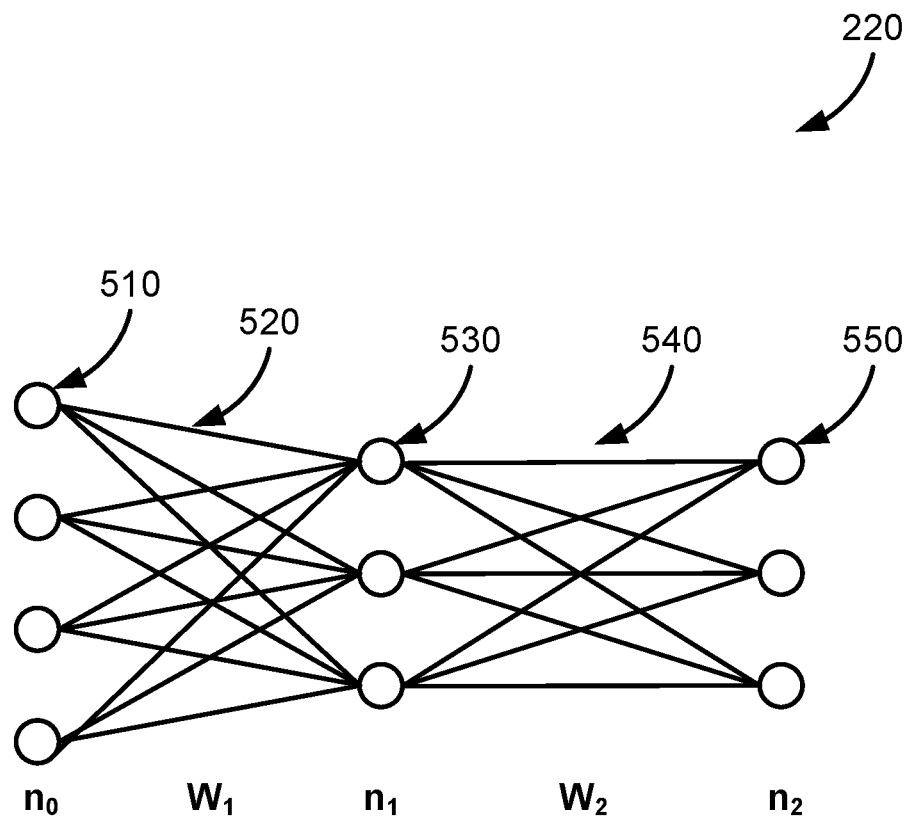
FIG. 4 is a schematic block diagram of initial layers of the neural network system of FIG. 2.

FIG. 4 shows layers of the initial neural network layers 220 that include a network of nodes 510, 530 and 550 and weighted edges 520 and 540. The initial neural network layers 220 shown in FIG. 4 have an input layer ($n_0$), a middle layer ($n_1$) and an output layer ($n_2$). Each of the layers ($n_0$, $n_1$, $n_2$) includes the nodes 510, 530 and 550, respectively, which are represented as circles, and are connected via the weighted edges 520 and 540.

In another arrangement, the initial neural network layers 220 are convolutional neural network layers, where the layers of the network are defined with a spatial arrangement representing the height and width of the input, and nodes of the network are convolved across spatial positions, such that the weighted edges corresponding to each node are shared at multiple spatial positions.

In another arrangement, the initial neural network layers 220 may include two or more layers. In yet another arrangement, the initial neural network layers 220 may have no layers, in which case the input video 100 is passed directly to the first RPN layer 230.

In another arrangement, the initial neural network layers 220 have recurrent neural network layers, where the input video and layers of the network are defined with an arrangement representing time steps, and weighted edges corresponding to each node are shared at multiple time positions.

The initial neural network layers 220 can be implemented as one or more software application programs 1533 in the computer system 1500, which are executable by the processor 1505, as described hereinbefore in relation to FIGS. 10A and 10B.

Each layer ($n_0$, $n_1$, $n_2$) of the initial neural network layers 220 includes a plurality of the nodes (510, 530, 550), such as nodes 530 in layer $n_1$, and the weighted edges (520, 540) that are input to the subset of nodes (530, 550), such as a subset of the weighted edges $W_1$ 520 being input to the nodes 530.

The nodes 510 in the layer ($n_0$) are connected to some or all of the nodes 530 in the layer ($n_1$) via the weighted edges 520. The nodes in the layer ($n_1$) 530 are in turn connected to some or all of the nodes 550 in the layer ($n_2$) via the weighted edges 540. Each weighted edge 520 or 540 has an associated real-value number representing the weight of the connection between the nodes 510 and 530, or between the nodes 530 and 550. Each of the nodes 510, 530 and 550 also include an additive bias input, which is a real-value number added to the activation value of nodes 510, 530 or 550. The activation value of each weighted edge 520 or 540 and the additive bias input associated with the nodes 510, 530 and 550, is determined via neural network training, for example by initialising the values using random numbers, and adjusting values according to stochastic gradient descent of a chosen target cost function.

For each instance input (e.g., an entire sequence of frames of the video 100) to the initial neural network layers 220, an associated activation value is determined for each of the nodes 510, 530 and 550. The activation value of each node (510, 530, 550) in a layer ($n_0$, $n_1$, $n_2$) is determined from the activation value of connected nodes in the previous layer, the associated weighted edge values between the connected nodes, and the additive bias associated with each of the nodes 510, 530 and 550. The additive bias is derived empirically.

In one example, an activation value of a node 530 in the layer m is determined from the activation value of nodes 510 in the layer $n_0$ that are connected to that node 530, the associated weighted edge values $W_1$ 520 between that node 530 and the connected nodes 510, and the additive bias associated with each of the nodes 530. Further, the activation value of a node 510 is determined using the additive bias for the node 510.

The initial neural network layers 220 process the image pixels in each of the N frames of the input video 100 to produce a plurality of feature responses for each of the N frames. The top-most (last) layer of the initial neural network layers 220 consists of C channels, so C×N feature responses are produced by the initial neural network layers 220.

For each of the N frames, the input layer $n_0$ receives input from image pixels. In one arrangement, each node 510 of the input layer $n_0$ receives input from each of the image pixels. In a second arrangement, each node 510 of the input layer $n_0$ receives input from groups of image pixels, and produces a response for each group of pixels. For example a first node 510 of the layer $n_0$ receives a group of pixels at a first position in a first frame of the video 100. The first group of pixels is, for example, a 3×3 image pixels starting from the position (1,1) in the first frame. The first node 510 of the input layer $n_0$ then receives a second group of pixels at a second position in the first frame of the video 100. The second group of pixels has the same size as the first group of pixels but shifted 1 pixel to the right, for example. Accordingly, the second group of pixels starts from the position (2,1) in the first frame. For each of the nodes 510 of the first layer $n_0$, the process continues until the input layer ($n_0$) processes all of the pixels in each of the N frames.

Accordingly, for each of the N frames, the image pixels processed at nodes 510 are relayed to the nodes 550 via the weighted edges 520 and 540 and the nodes 530 to produce a feature response.

In one arrangement of fully connected layers of neural network 220 where N=300 frames and C=100 channels, then the output of the initial neural network layers 220 is a 100×300 feature responses.

In another arrangement, temporal pooling is performed in the initial neural network layers 220 such that there are T time positions that are different to the number of frames (N). For example, where T=100 time positions and N=300 frames, the initial neural network layers 220 outputs a 100×100 feature responses due to the pooling.

To perform classification of N frames, the pixels of each of the N frames are provided to the initial neural network layers 220 and are used as the activation value for each of the input nodes 510. Activation of nodes 530 and 550 in each layer ($n_1$, $n_2$) is performed by propagation of values from the input nodes 510, according to the weight (i.e., strength) of the weighted edges 520 and 540 between the nodes 510, 530 and 550, and other functions defined by the network such as a rectified-linear activation function. An example of a rectified-linear activation function (ReLU) is as follows:

$$\text{ReLU}(x) = \max(0, x) \quad (1)$$

During training of the neural network 200, instances of training data (i.e., training image pixels of training frames) are provided to the initial neural network layers 220. For each instance of the training data, the activation of the output nodes of the classification layer 250 is determined and compared with a corresponding training target, and the difference is used to modify the weighted edges of the initial neural network layers 220, the RPN layers 230 and 240 and the classification layer 250. This includes the weighted edges 520 and 540 of the initial neural network layers 220. Therefore, in the training, the network 200 learns to recognize the relationship between the input data (i.e., the N frames of the video 100) and the target labels. In the present disclosure, target, training target, and target label correspond to the same concept. In one arrangement, a target label is represented by a value that has meaning for humans, e.g. "jump", while a target is represented by a number, e.g. 23, which is an internal representation for "jump".

The feature response output of the initial neural network layers 220 is provided to the RPN layer 230.

The RPN Layer

The relative-position network (RPN) layer 230 or 240 receives the feature response with two dimensions (i.e., channels (C), and time positions (T) or frames (N)) from the initial neural network layers 220, and produces output with two dimensions (RPN feature channels C2 or C3, and time (T or N)) for subsequent layers such as the RPN layer 240 or the classification layer 250 respectively.

The RPN layers 230 and 240 can be implemented as one or more software application programs 1533 in the computer system 1500, which are executable by the processor 1505, as described hereinbefore in relation to FIGS. 10A and 10B.

The C×N feature response from the initial neural network layers 220 is input to the RPN layer 230. In the arrangement shown in FIG. 2, two RPN layers 230 and 240 are used and, accordingly, the C2×N feature response from the RPN layer 230 is input to the RPN layer 240. In another arrangement, one RPN layer or more than two RPN layers can be used.

Figure 3:
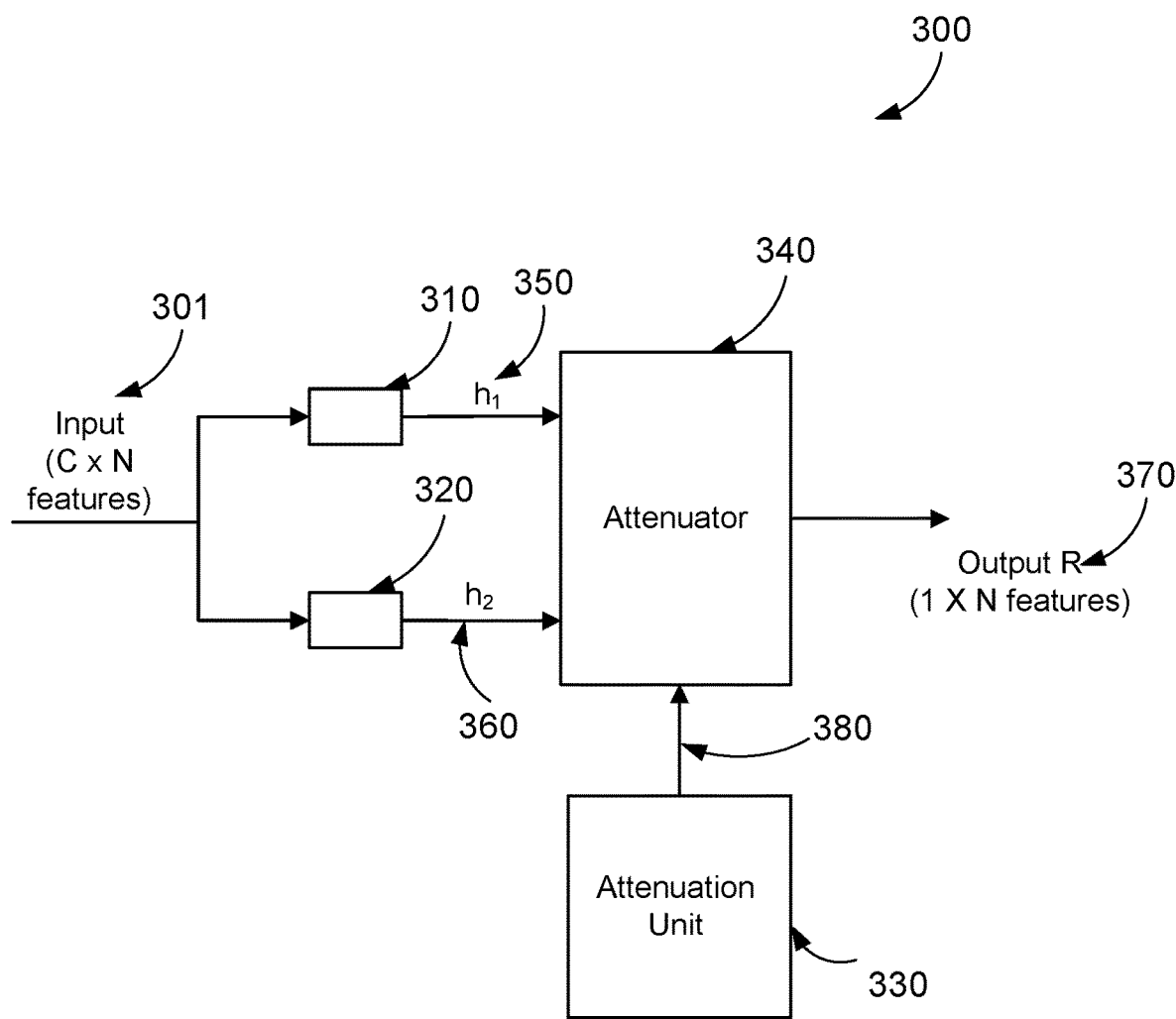
FIG. 3 is a schematic block diagram of a relative-position network (RPN) unit in a RPN layer of the neural network system of FIG. 2.

Each of the RPN layers 230 and 240 includes multiple RPN units 300. The structure of each RPN unit 300 is shown in FIG. 3, where each RPN unit 300 accepts a feature response output of either the initial neural network layers 220 or the RPN layer 230 as input. That is, the RPN units 300 of the RPN layer 230 receive the feature response output of the initial neural network layers 220 as input, while the RPN units 300 of the RPN layer 240 receive the feature response output of the RPN layer 230 as input. The term of "input feature map" refers to the feature response (i.e., the C×N feature response of the initial neural network layers 220 and the C2×N feature response of the RPN layer 230) that is being inputted into the RPN layers 230 and 240 respectively.

Each RPN unit 300 produces an output R 370 of dimension 1×N. Therefore, when the number of RPN units 300 in the RPN layer 230 is C2, the RPN layer 230 produces an output of C2×N feature responses. Similarly, when the number of RPN units 300 in the RPN layer 240 is C3, the RPN layer 240 produces an output of C3×N feature response. The RPN unit 300 includes two internal feature modules 310 and 320, an attenuation unit 330 and an attenuator module 340.

Each of the RPN units 300 produces a 1×N feature response 370, where each feature response may indicate an event (which may correspond with a simple or complex action in the input, a property corresponding with a point in time, or no action) occurring at a particular time instance in the video 100. The RPN unit 300 determines a number of events occurring at particular time instances by using relative time positions between pairs of determined events (for example a pair of simple actions) detected by the RPN unit 300. Different RPN units 300 in each of the RPN layers 230 and 240 assess different pairing of events, such as pairs of simple actions. The output of all the RPN units 300 in a particular RPN layer 230 or 240 provides an indication of a number of actions or events occurring throughout the video 100.

The second RPN layer 240 further processes the predicted actions to more accurately determine the accuracy of the actions predicted by the RPN layer 230, or to determine more complex events as combinations of events identified by the RPN layer 230.

An RPN unit 300 produces a 1×N feature response 370 based on the relative temporal distance between two actions identified by internal feature modules 310 and 320 (see FIG. 3), for example a simple action detected by the internal feature module 320 occurring after a simple action detected by the internal feature module 310.

The RPN unit 300 produces feature responses that are invariant to certain changes in temporal position of actions identified by the internal feature modules 310 and 320. The degree of invariance is specific to each RPN unit, and is learnt by training.

For example, a first RPN unit may have a degree of invariance of between 50 and 80 frames, thereby producing a similar response if a given set of responses $h_1$ 350 and $h_2$ 360 occur with a separation anywhere between 50 and 80 frames. On the other hand, a second RPN unit may have a degree of invariance of between 50 and 60 frames, thereby producing a first response when the same responses $h_1$ 350 and $h_2$ 360 occur with a separation of 50 frames, but producing a response different to the first response when the same responses $h_1$ 350 and $h_2$ 360 occur with a separation of 80 frames.

As described in relation to FIG. 1, a complex action consists of ordered simple actions, where certain ordering of simple actions provides a strong indication of a complex action. The temporal separation between the simple actions can vary substantially in different instances of a complex action.

The output of the RPN unit 300 encodes a sequence of two actions, and provides a feature response that is invariant to a range of time differences as observed from training instances. The output of the RPN unit 300 can produce a response corresponding to an action, regardless of large variations in the temporal separation of the constituent actions. The RPN unit can also produce a response corresponding to an action that is selective for a specific range of temporal separation of the constituent actions, which may be a narrow range of temporal separations. Several layers of RPN units can identify arrangements of constituent actions and specific sequences, with a degree of variation in temporal separation between each constituent action. As a result layers of RPN units can identify actions which can be composed of constituent actions occurring in many different temporal configurations.

Further, the RPN layers 230 and 240 are memory efficient due to relatively small memory footprint of an RPN unit 300. Also, the RPN units 300 do not suffer from instability issues like recurrent neural networks due to the absence of recurrent connections.

Each of the internal feature modules 310 and 320 of each RPN unit 300 is trained to identify events occurring in the input feature map. Different RPN units 300 have different internal feature modules 310 and 320 to identify different pairing of simple actions.

The attenuation unit 330 is trained to produce an attenuation function response 380. The attenuator 340 combines the feature responses from the internal feature modules 310 and 320 with the attenuation function response 380 to produce a 1×N feature response as the output 370.

FIG. 5 shows a flowchart of a method 600 of processing the input feature map (i.e., from either the initial neural network layers 220 or the RPN layer 230) in each of the RPN units 300 in the RPN layer 230 and 240. The method 600 can be implemented as one or more software application programs 1533 in the computer system 1500, which are executable by the processor 1505, as described hereinbefore in relation to FIGS. 10A and 10B.

The method 600 commences at step 620 where weighted combinations of the input feature map are determined. As described hereinbefore, the input feature map of the RPN layers 230 and 240 are the output of the initial neural network layers 220 and the RPN layer 230 respectively. The method 600 will be described in relation to the RPN unit 300 of the RPN layer 230, which means the input feature map is the C×N feature response of the initial neural network layers 220. However, the method 600 is similarly applicable when the RPN unit 300 is in the RPN layer 240 and processing the C2×N feature response from the RPN layer 230.

Step 620 is performed by the internal feature modules 310 and 320, which process the input feature map to generate feature responses. The internal feature module 310 or 320 processes input C×N feature response for each frame of the N frames and determines weighted combinations of the input feature map according to the equation:

$$h = \sigma(W_h^T \cdot x + b_h) \quad (2)$$

where, $W_h$ represents a column vector of length C that is defined during training of the system 200, x is the input feature map and $W_h^T \cdot x$ represents dot product operation between transpose of vector $W_h$ and x, which is the input feature response for a particular time t, $t \in [1, N]$. The parameter '$b_h$' represents an additive bias input of the internal feature modules 310 and 320, which is predefined during training of the system 200. The function $\sigma(\ )$ is a nonlinear function, such as the rectifier function $\sigma(y)=\max(y, 0)$. The feature response h is the weighted combination of the input feature map x and represents a response value determined for a particular time t, $t \in [1, N]$. Thus, the feature response h of the feature map module 310 or 320 is an output vector of length N.

When step 620 is performed by the RPN unit 300 in the RPN layer 240, equation 2 becomes:

$$h = \sigma(W_h^T \cdot x_2 + b_h) \quad (3)$$

where $W_h$ represents a column vector of length C that is predefined during training of the system 200, $x_2$ is the feature response obtained from the input feature map and $W_h^T \cdot x_2$ represents dot product operation between transpose of vector $W_h$ and $x_2$, which is the input feature response for a particular time t, $t \in [1, N]$. The parameter '$b_h$' represents an additive bias input of the internal feature modules 310 and 320, which is predefined during training of the system 200. The function $\sigma(\ )$ is a nonlinear function, such as the rectifier function $\sigma(y)=\max(y, 0)$. The feature response h is the weighted combination of the input feature map and represents a response value determined for a particular time t, $t \in [1, N]$. Thus, the feature response h of the feature map module 310 or 320 is an output vector of length N.

Figure 6:
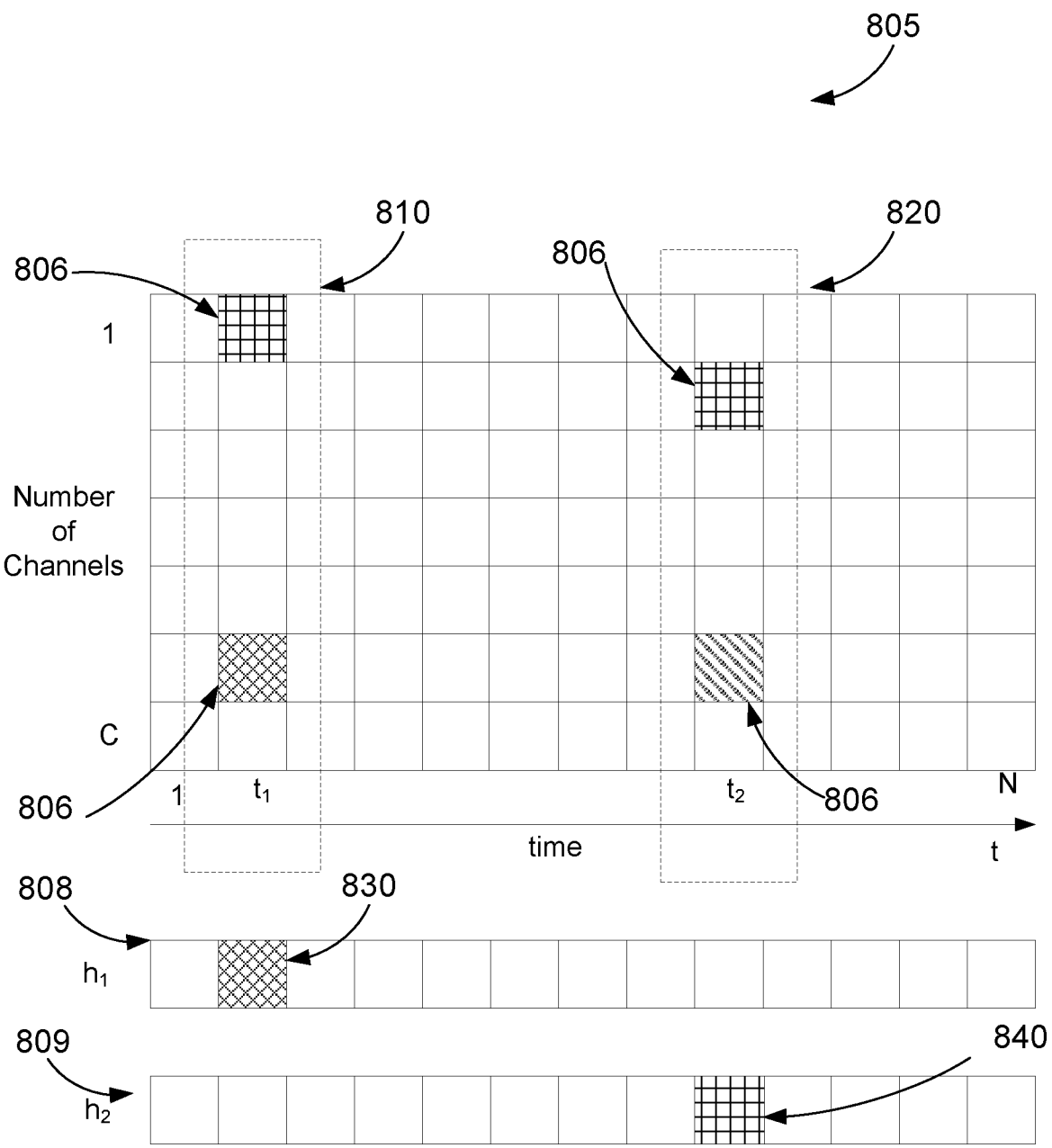
FIG. 6 illustrates the relationship between the feature responses generated by the initial layers of FIG. 4 and the generation of the internal feature map of the RPN unit of FIG. 3.

FIG. 6 illustrates the internal feature map calculations performed by the internal feature modules 310 and 320 when executing the calculation of equation 2. The input feature map 805 represents the C×N feature response from the initial neural network layers 220, with each cell representing a feature response in the C×N feature response; and each column representing C feature response of one frame of the N frames.

The feature response $h_1$ (denoted by the number 808, same as 350 of FIG. 3) is the output of the internal feature module 310. Each cell of the feature response $h_1$ 808 at each time instant t corresponds to a C feature response of the input feature map 805 at the same time instant t. The value of each cell of the feature response $h_1$ 808 is obtained from equation 2, where x in equation 2 corresponds to the values of the corresponding column in the input feature map 805.

The feature response $h_2$ (denoted by the number 809, same as 360 of FIG. 3) is the output of the internal feature module 320. Each cell of the feature response $h_2$ 809 at each time instant t corresponds to a C feature response of the input feature map 805 at the same time instant t. The value of each cell of the feature response $h_2$ 809 is obtained from equation 2, where x in equation 2 corresponds to the values of the corresponding column in the input feature map 805.

In the input feature map 805, cells 806 are marked as examples of feature responses having high response values (i.e., values greater than zero) after being processed by the input neural network layers 220. The remaining unmarked cells in the input feature map 805 are unmarked to simplify the explanation. In the example provided in FIG. 1, the complex action to be recognized is 'making a fried egg' consisting of 5 simple actions as shown in the video 100. In the example of FIG. 6, the C feature response 810 at time instant $t_1$ shows an example of where the simple action of 'pour oil' 110 takes place, resulting in high value feature responses at cells 806. In this example, the internal feature module 310 has been trained to identify the simple action of 'pour oil' 110, which corresponds with high response values in the cells 806 in the C feature response 810.

Similar to the simple action of 'pour oil' 110, the C feature response 820 is a feature response at time instant $t_2$ for another simple action of 'crack an egg' 120, resulting in high value feature responses at cells 806 in the C feature response 820. In this example, the internal feature module 320 has been trained to identify the simple action of 'crack an egg' 120, which corresponds with high response values in the cells 806 in the C feature response 820.

Once the internal feature modules 310 and 320 process the input feature map 805 to generate the feature responses h1 808 (same as 350) and h2 809 (same as 360), the method 600 proceeds from step 620 to step 630.

At step 630, the attenuator 340 generates an output feature map 370 based on mutual temporal relationships between the weighted combinations $h_1$ 350 and $h_2$ 360, and an attenuation function response 380 of the attenuation unit 330.

Figure 8:
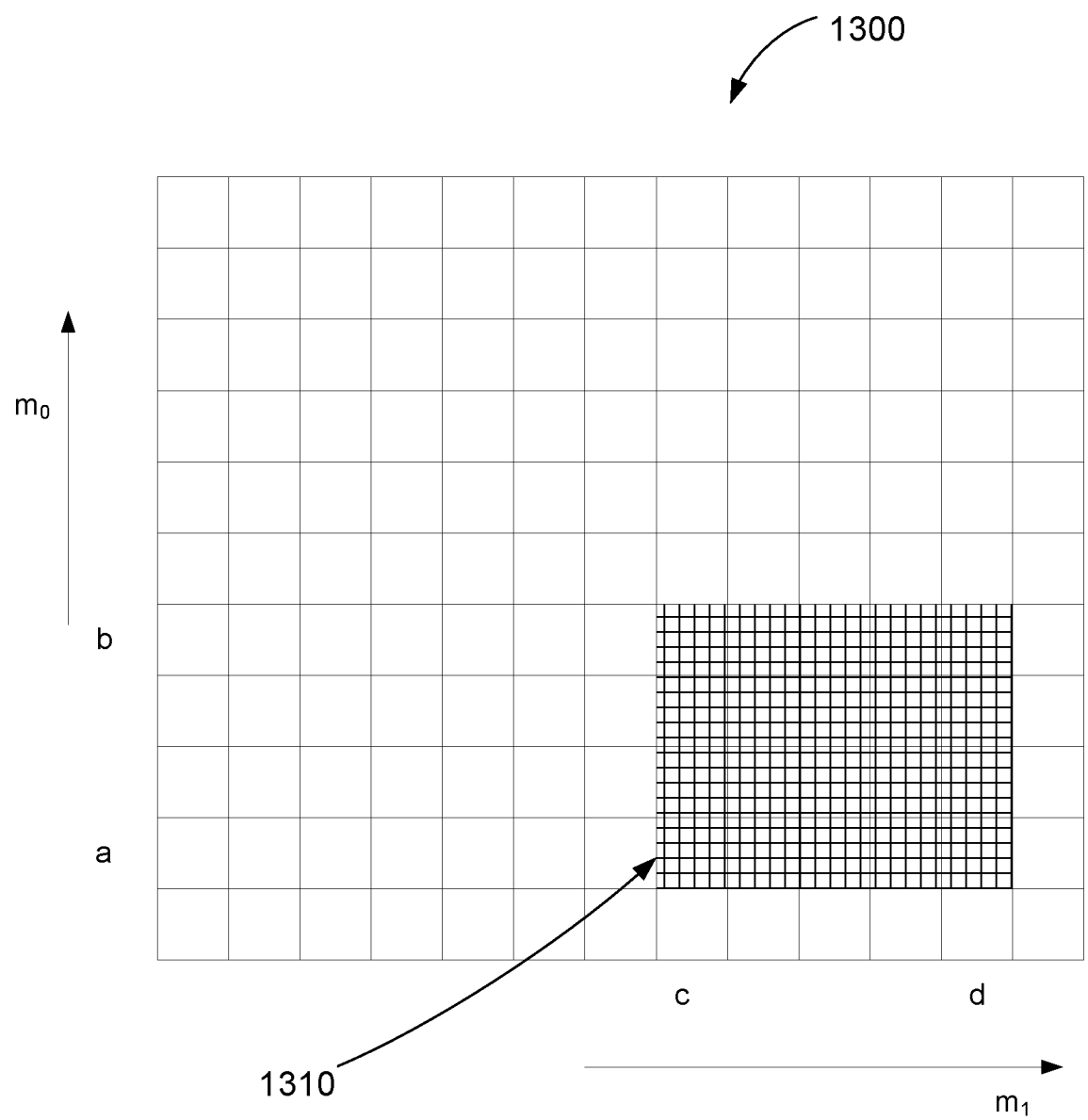
FIG. 8 shows an example attenuation function response of the attenuation unit of FIG. 3.

FIG. 8 shows an example of an attenuation function response $A_i$ 1300. The filled blocks 1310 represent high response values, while the unfilled blocks represent low response values (e.g., values of zero). The high response values indicate temporal relationships between responses $r_1$ and $r_2$ that can produce high output response values from the RPN unit 300, and low response values indicating temporal relationships that are attenuated such that the responses $r_1$ and $r_2$ do not produce high output response values from the RPN unit 300. The temporal relationships represented by the attenuation function response $A_i$ 1300 correspond with the time difference between two events identified by the internal feature modules 310 and 320.

The attenuation function response will be described in detail hereinafter in relation to training of the RPN unit 300.

The attenuator 340 receives and processes the attenuation function response 380 (i.e., $a=f(m_0, m_1)$) from the attenuation unit 330 and the two feature responses $h_1$ 350 and $h_2$ 360, as shown in FIG. 3. The attenuator 340 then outputs a response vector R 370 of length 1×N. In other words, the response vector R is the output feature map of one RPN unit 300 with a length of 1×N.

The response vector $R_i$ 1470 is determined as follows:

$$R_i = \max(J_i \cdot * A_i) \quad (4)$$

where, in one embodiment, $J_i$ (a feature vector) 1440 is determined as follows:

$$J_i[k] = h_1[i] + h_2[k] \forall k \in [1, N] \quad (5\text{-}1)$$

In a second embodiment, $J_i$ 1440 is determined as follows $$J_i[k] = h_1[i] * h_2[k] \forall k \in [1, N] \quad (5\text{-}2)$$

And in a third embodiment, $J_i$ 1440 is determined as follows $$J_i[k] = \sqrt{h_1[i] * h_2[k]} \forall k \in [1, N] \quad (5\text{-}3)$$

An attenuation vector $A_i$ 1450 is determined using the attenuation function $a = f(m_0, m_1)$ as follows:

$$A_i[k] = a(i, k) \forall k \in [1, N] \quad (6)$$

Where, '.*' represents an element-wise vector multiplication between vectors $J_i$ and $A_i$; and max( ) represents a maximum function which selects the maximum value of the vector.

The response vector R 370 of length 1×N is the output of each RPN unit 300.

Figure 9:
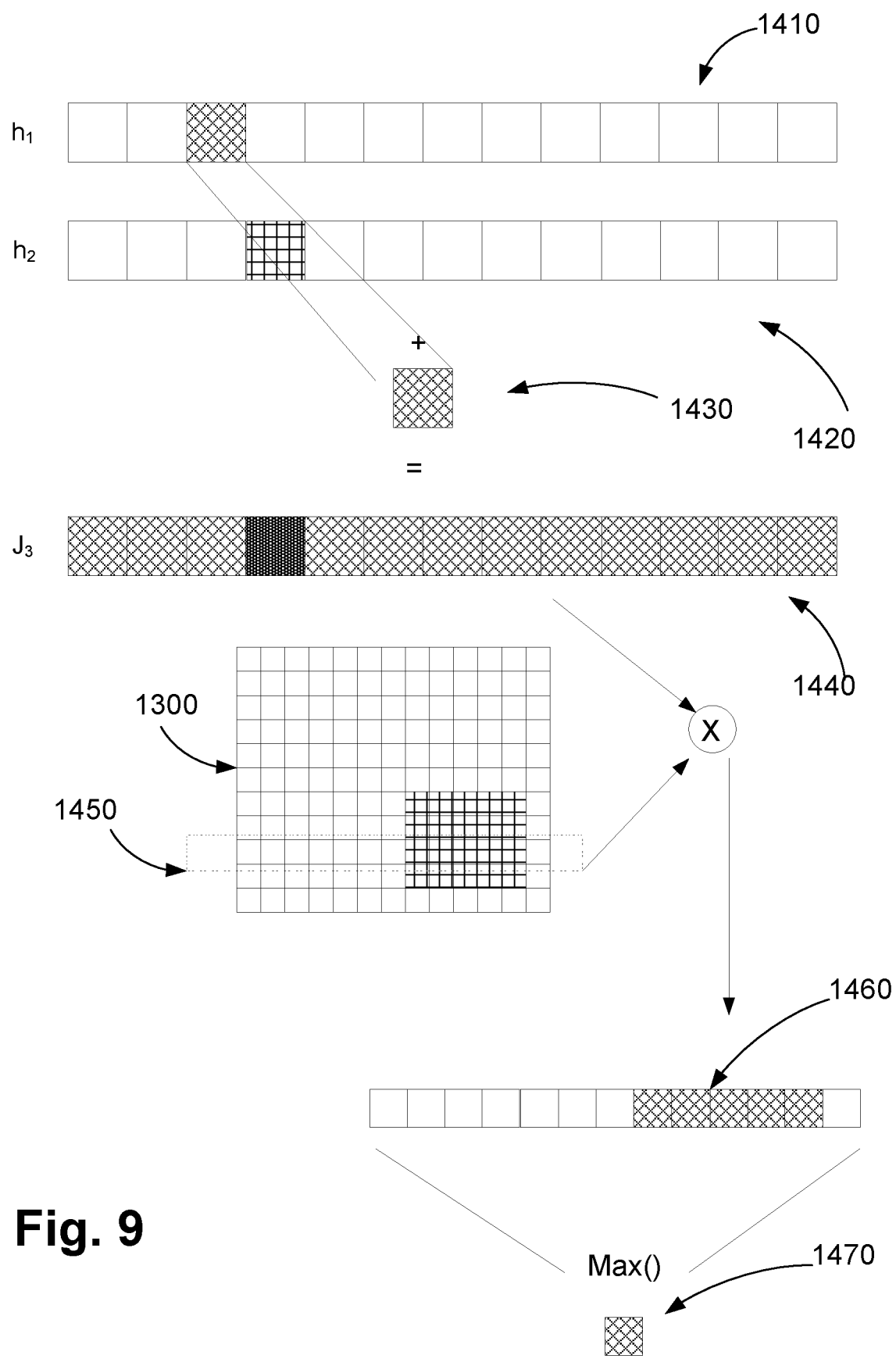
FIG. 9 shows the data processing of the attenuator of the RPN unit of FIG. 3 to generate a response vector.

The generation process of the response vector R is now explained using FIG. 9. Firstly, a feature vector $J_i$ is determined using any one of equations 5-1; 5-2; and 5-3. As an example, if equation 5-1 is used and i=3, then the feature vector $J_i$ is determined by adding $h_1[3]$ 1430 (from vector $h_1$ 1410) to vector $h_2$ 1420 to produce vector $J_3$ 1440.

The attenuation vector $A_2$ is obtained from the attenuation function shown in FIG. 8. FIG. 9 shows the attenuation function response $A_i$ 1300 with a row 1450 representing attenuation vector $A_2$ as per equation 6.

In accordance with equation 4, the attenuation vector $A_2$ 1450 and vector $J_3$ 1440 are multiplied to produce a vector $r_2$ 1460. A value at i=3 in the response vector R 1470 is determined as the max value of the vector $r_2$ as per equation 4. The above described process is repeated for t=1 to N to determine the response vector R 1470.

The combined output of the response vector R 370 of all the RPN units 300 in the RPN layer 230 or 240 is the output feature map of the RPN layer 230 or 240. As described hereinbefore, the output feature map has a dimension of C2×N for the RPN layer 230 and a dimension of C3×N for the RPN layer 240.

The method 600 concludes at the conclusion of step 630.

The output feature map generated by the RPN layer 240 using the method 600 is provided to the classification layer 250. Examples of classifiers that can be used in the classification layer are the soft-max layer, and subsequent neural network layers. The soft-max layer is a fully connected layer between the input features of the classification layer 250 and a number of classification units, and is used to generate classification scores of multiple classes as a probability distribution. The classification layer 250 then produces scores indicating a probability estimate of actions being performed in the video 100.

Training of an RPN Unit

The attenuation unit 330 generates an attenuation function $a = f(m_0, m_1)$ where, $m_0 \in [1, N]$ and $m_1 \in [1, N]$. The attenuation function defines a relationship between the temporal positions $m_0$ and $m_1$, corresponding with the responses $h_1$ 350 and $h_2$ 360 (which is the associated temporal position values), and an attenuation factor used for defining the output response 380.

In one embodiment, the attenuation unit 330 is defined as follows.

$$a = \max(\min(r, 1), 0) \quad (7)$$

Where:

$$r = |d_t| w + b \quad (8)$$

$$d_t = m_0 - m_1 - t_0 \quad (9)$$

Where $m_0$ is the temporal position corresponding with response $r_1$, $m_1$ is the temporal position corresponding with response $r_2$, $t_0$, w and b are parameters learned during training, $t_0$ is the reference position, and $d_t$ is the time difference between occurrence of feature response $h_1$ and $h_2$.

Figure 7:
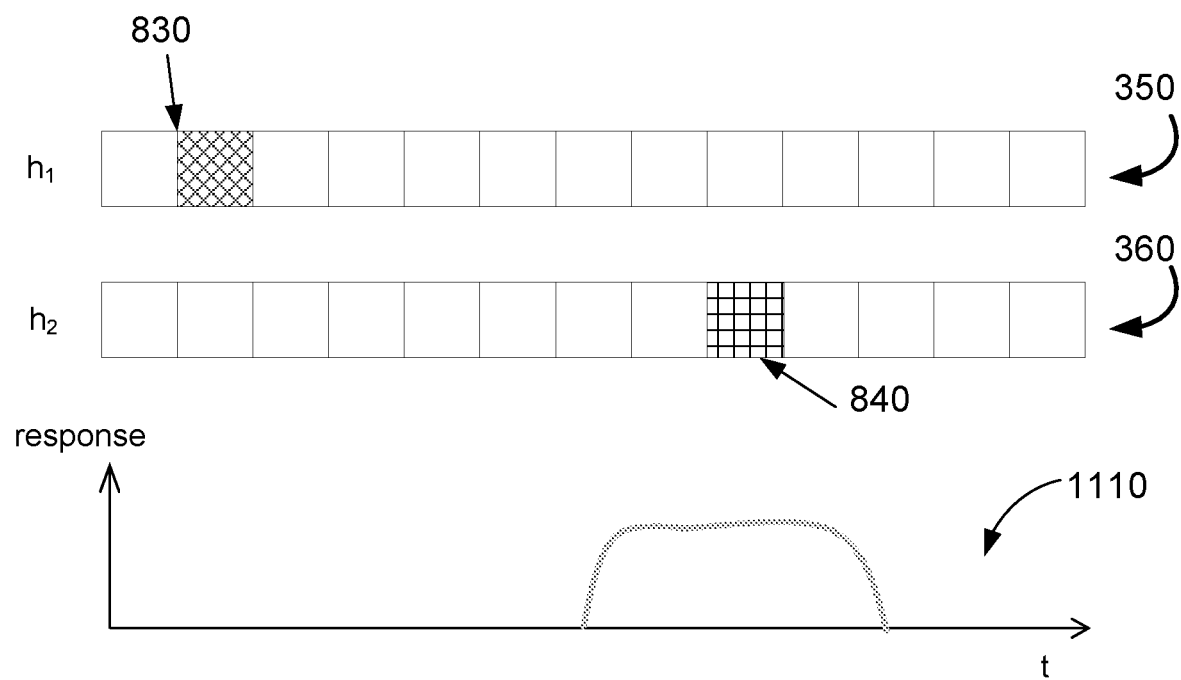
FIG. 7 shows the attenuation function response of FIG. 8 at a particular time instance.

In a second arrangement, the attenuation unit 330 is defined as follows.

$$a = e^{-(w_1 p^2 - 2 w_2 pq + w_3 q^2)} \quad (10)$$

$$p = m_0 - w_4 \quad (11)$$

$$q = m_1 - w_5 \quad (12)$$

Where $m_0$ is the temporal position corresponding with response $h_1$ 350, $m_1$ is the temporal position corresponding with response $h_2$ 360, and $w_1$, $w_2$, $w_3$, $w_4$ and $w_5$ are parameters learned during training, which define the attenuation response 1110 in FIG. 7. The attenuation unit 330 therefore produces output a, which is a mapping function a=f ($m_0$, $m_1$) where, $m_0 \in [1, N]$ and $m_1 \in [1, N]$.

Training of the trainable parameters of the RPN unit is performed using a target objective function of the network 200. The target objective function is defined in the classification layer 250, for example the target objective function cost is defined as follows:

$$\text{cost} = -\Sigma_i y_i \log(o_i) + (1 - y_i) \log(1 - o_i) \quad (13)$$

Where $y_i$ is the target distribution, and $o_i$ is the output of the softmax-layer in the classification layer 250.

Training of each trainable parameter is performed using a gradient, calculated as the partial derivative of the cost with respect to each parameter, for example:

$$w_t = w_{t-1} - \alpha \frac{\delta \text{cost}}{\delta w} \quad (14)$$

Where $w_t$ is the value of the trainable parameter at time step t, and $\alpha$ is the learning rate defining how large an update is performed.

Training is performed by presenting example training instances as input 100 to the network 200, defining the target classification y for the instance, determining the feature responses for each component (220, 230, 240, and 250) of the network 200, determining the gradient value and updating each trainable parameter of the network as described in equation 14.

FIG. 7 shows an example attenuation function response 1110 (which is the same as the attenuation function response 1450 in FIG. 9) after training has been performed, for a given value of $m_0$, where $m_0$ corresponds with the temporal index of the $r_1$ response 830 of the response $h_1$ 350. The response 1110 shows a high value at and near temporal index 840 that allows a high response of the RPN unit output if response $h_1$ 350 has a high response at temporal index 830 and response $h_2$ 360 has a high response near temporal index 840. The response 1110 does not allow a high response value of the RPN unit output when high responses for $h_2$ 360 occur at temporal positions outside of the range of the high responses of the attenuation function 1110 and no high responses of $h_2$ 360 occur within the range of the high responses of the attenuation function 1110.

Therefore, the attenuation function is based on a weighted combination of temporal position values (e.g., 830 and 840) of each of the first plurality of feature responses ($h_1$ 350 and $h_2$ 360).

The invention claimed is:

1. An information processing method for an information processing apparatus for recognizing actions in a video over a period of time, the information processing method comprising:
   inputting a plurality of frames in the video having captured a first action containing a plurality of second actions into a neural network;
   determining a weighted combination of a first plurality of feature responses associated with a sequence of the second actions over the period of time using a set of weights at a particular time instance in the period of time, the first plurality of feature responses being an output from the neural network based on the inputting of the plurality of frames;
   generating a second plurality of feature responses based on the weighted combination of the first plurality of feature responses and a weighted combination of temporal position values of each of the first plurality of feature responses; and
   recognizing the first action by using a the weighted combination of the first plurality of feature responses, the generated second plurality of feature responses and the temporal position values of each of the first plurality of feature responses associated with the sequence of the second actions,
   wherein the determining of the weighted combinations of the first plurality of feature responses and the generating of the second plurality of feature responses are performed by a plurality of relative-position network (RPN) layers in the neural network, each of the RPN layers determining one of the sequence of second actions occurring at the particular time instance.

2. The information processing method according to claim 1, the method further comprising processing data to produce the first plurality of feature responses.

3. The information processing method according to claim 1, wherein the weighted combination of temporal position values is used to determine an attenuation function.

4. The information processing method according to claim 3, wherein each of the RPN layers determines one of the sequence of second actions occurring at the particular time instance by determining two of the second actions and using the attenuation function.

5. An information apparatus configured for recognizing actions in a video over a period of time, the information processing apparatus comprising: one or more processors; and one or more memories storing executable instructions which, when executed by the one or more processors, cause the information processing apparatus to perform operations including:
   inputting a plurality of frames in the video having captured a first action containing a plurality of second actions into a neural network;
   determining a weighted combination of a first plurality of feature responses associated with a sequence of the second actions over the period of time using a set of weights at a particular time instance in the period of time, the first plurality of feature responses being an output from the neural network based on the inputting of the plurality of frames;
   generating a second plurality of feature responses based on the weighted combination of the first plurality of feature responses and a weighted combination of temporal position values of each of the first plurality of feature responses; and recognizing the first action by using a the weighted combination of the first plurality of feature responses, the generated second plurality of feature responses and the temporal position values of each of the first plurality of feature responses associated with the sequence of the second actions, wherein the determining of the weighted combinations of the first plurality of feature responses and the generating of the second plurality of feature responses are performed by a plurality of relative-position network (RPN) layers in the neural network, each of the RPN layers determining one of the sequence of second actions occurring at the particular time instance.

6. The information processing apparatus according to claim 5, wherein executing the executable instructions causes the information processing device to perform further operations including: processing data to produce the first plurality of feature responses.

7. The information processing apparatus according to claim 5, wherein executing the executable instructions causes the information processing device to perform further operations including: determining an attenuation function using the weighted combination of temporal position values.

8. The information processing apparatus according to claim 7, wherein executing the executable instructions causes the information processing device to perform further operations including:
   determining, by each of the RPN units, one of the sequence of second actions occurring at the particular time instance by determining two of the second actions and using the attenuation function.

9. A non-transitory computer readable storage medium storing a program to cause a computer to perform a method for an information processing apparatus for recognizing actions in a video over a period of time, the information processing method comprising:
   inputting a plurality of frames in the video having captured a first action containing a plurality of second actions into a neural network;
   determining a weighted combination of a first plurality of feature responses associated with a sequence of the second actions over the period of time using a set of weights at a particular time instance in the period of time, the first plurality of feature responses being an output from the neural network based on the inputting of the plurality of frames;
   generating a second plurality of feature responses based on the weighted combination of the first plurality of feature responses and a weighted combination of temporal position values of each of the first plurality of feature responses; and
   recognizing the first action by using a the weighted combination of the first plurality of feature responses, the generated second plurality of feature responses and the temporal position values of each of the first plurality of feature responses associated with the sequence of the second actions,
   wherein the determining of the weighted combinations of the first plurality of feature responses and the generating of the second plurality of feature responses are performed by a plurality of relative-position network (RPN) layers in the neural network, each of the RPN layers determining one of the sequence of second actions occurring at the particular time instance.

* * * * *